United States Patent
Mihan et al.

(10) Patent No.: US 7,714,091 B2
(45) Date of Patent: May 11, 2010

(54) CATALYST COMPRISING CHROMIUM AND ZIRCONIUM FOR THE POLYMERIZATION AND/OR COPOLYMERIZATION OF OLEFINS

(75) Inventors: Shahram Mihan, Bad Soden (DE);
Andreas Haufe, Ludwigshafen (DE);
Peter Kölle, Köln-Rodenkirchen (DE);
Joachim Wulff-Döring, Frankenthal (DE); Ingo Treffkorn, Dudenhofen (DE); Guido Funk, Worms (DE)

(73) Assignee: Basell Polyolefine GmbH, Wes seling (DE)

( * ) Notice: Subject to any disclaimer, the term of this patent is extended or adjusted under 35 U.S.C. 154(b) by 689 days.

(21) Appl. No.: 11/629,102

(22) PCT Filed: Jun. 9, 2005

(86) PCT No.: PCT/EP2005/052681

§ 371 (c)(1),
(2), (4) Date: Dec. 8, 2006

(87) PCT Pub. No.: WO2005/123793

PCT Pub. Date: Dec. 29, 2005

(65) Prior Publication Data

US 2008/0269437 A1    Oct. 30, 2008

Related U.S. Application Data

(60) Provisional application No. 60/590,663, filed on Jul. 23, 2004.

(30) Foreign Application Priority Data

Jun. 16, 2004  (DE) .................. 10 2004 028765

(51) Int. Cl.
*C08F 110/02*  (2006.01)
*C08F 4/16*  (2006.01)
*C01F 4/22*  (2006.01)
*B01J 31/34*  (2006.01)
*B08J 31/38*  (2006.01)

(52) U.S. Cl. .................. 526/352; 526/106; 526/130; 526/158; 502/113; 502/256; 502/228; 502/227

(58) Field of Classification Search .................. 526/130, 526/106, 352, 158; 502/113, 256, 228, 227
See application file for complete search history.

(56) References Cited

U.S. PATENT DOCUMENTS

| 3,165,504 | A | * | 1/1965 | Hogan ........................ 526/96 |
| 3,242,150 | A |   | 3/1966 | Scoggin |
| 3,248,179 | A |   | 4/1966 | Norwood |
| 4,037,042 | A | * | 7/1977 | Mueller-Tamm et al. .... 526/106 |
| 4,128,500 | A |   | 12/1978 | Hwang et al. |
| 4,182,810 | A |   | 1/1980 | Willcox |
| 4,284,527 | A |   | 8/1981 | Pullukat et al. |
| 4,454,242 | A | * | 6/1984 | Ikegami et al. .............. 502/113 |
| 4,814,308 | A |   | 3/1989 | Konrad et al. |
| 5,026,795 | A |   | 6/1991 | Hogan |
| 5,032,651 | A |   | 7/1991 | McDaniel et al. |
| 5,455,216 | A |   | 10/1995 | Mueller et al. |
| 5,625,013 | A |   | 4/1997 | Mueller et al. |

FOREIGN PATENT DOCUMENTS

| BE | 861275 | 3/1978 |
| DE | 2540279 | 3/1977 |
| DE | 3635710 | 4/1988 |
| EP | 166157 | 1/1986 |
| EP | 229368 | 7/1987 |
| EP | 589350 | 3/1994 |
| GB | 1541188 | 2/1979 |
| JP | 59 015407 | 1/1984 |
| WO | 92/17511 | 10/1992 |
| WO | 97/48743 | 12/1997 |

OTHER PUBLICATIONS

M. McDaniel, "Supported Chromium Catalysts for Ethylene Polymerization," *Advances in Catalysis*, vol. 33, p. 48-98 (1985).
M. McDaniel, "Supported Chromium Catalysts for Ethylene Polymerization," *Advances in Catalysis*, vol. 33, p. 62-98 (1985) (see AO).
S. Brunauer et al., "Adsorption of Gases in Multimolecular Layers," *Journal of American Chemical Society*, vol. 60, p. 309-319 (1938).

* cited by examiner

*Primary Examiner*—Ling-Siu Choi
(74) *Attorney, Agent, or Firm*—William R. Reid; Jonathan L. Schuchardt

(57) ABSTRACT

Catalyst for the polymerization and/or copolymerization of olefins which is obtainable by application to a finely divided inorganic support and concluding calcination at temperatures of from 350 to 1050° C. and has a chromium content of from 0.1 to 5% by weight and a zirconium content of from 0.5 to 10% by weight, in each case based on the element in the finished catalyst, with the molar ratio of zirconium to chromium being from 0.6 to 5.

26 Claims, No Drawings

CATALYST COMPRISING CHROMIUM AND ZIRCONIUM FOR THE POLYMERIZATION AND/OR COPOLYMERIZATION OF OLEFINS

This application is the U.S. national phase of International Application PCT/EP2005/052681, filed Jun. 9, 2005, claiming priority to German Patent Application 102004028765.1 filed Jun. 16, 2004, and the benefit under 35 U.S.C. 119(e) of U.S. Provisional Application No. 60/590,663, filed Jul. 23, 2004; the disclosures of International Application PCT/EP2005/052681, German Patent Application 102004028765.1 and U.S. Provisional Application No. 60/590,663, each as filed, are incorporated herein by reference.

The invention relates to a catalyst for the polymerization and/or copolymerization of olefins which is obtainable by application to a finely divided inorganic support and concluding calcination at temperatures of from 350 to 1050° C. and has a chromium content of from 0.1 to 5% by weight and a zirconium content of from 0.5 to 10% by weight, in each case based on the element in the finished catalyst, with the molar ratio of zirconium to chromium being from 0.6 to 5.

Ethylene homopolymers and copolymers of ethylene with higher α-olefins such as 1-butene, 1-pentene, 1-hexene or 1-octene can be prepared, for example, by polymerization using supported titanium compounds, known as Ziegler-Natta catalysts, or else supported chromium compounds, known as Phillips catalysts. When the polyethylene homopolymers and copolymers are used, for example, for the blown film extrusion process, it is important that they have a good balance between mechanical properties and processability.

It is known that supported chromium catalysts are very suitable for producing polyethylene copolymers having good mechanical properties. The properties of the polymers obtained in the polymerization are dependent on the way in which the chromium catalyst used has been prepared, in particular on the nature of the support material, e.g. its chemical structure, physical structure, surface area or pore volume, the type of chromium compound used, the presence of further compounds such as titanium compounds, aluminum alkyls or carbon monoxide, the order in which the various components are applied or the way in which calcination and activation are carried out. It is a combination of the starting materials used together with the formulation for application to the support which then produces the desired chromium catalyst for the preparation of polymers corresponding to the requirement profile for the specific fields of application.

Phillips catalysts have been used for decades for the polymerization of ethylene. They are usually prepared by applying a chromium compound to an inorganic support and subsequently calcining this at temperatures of from 350 to 950° C. The calcincation converts chromium present in valences lower than six into the hexavalent state.

In general, the activity of the catalyst firstly increases sharply as the calcination temperature increases until, finally, the support begins to sinter on increasing the temperature further and the activity decreases again. On the other hand, the molecular weight of the polyethylene prepared increases sharply with increasing temperature. Particularly in the preparation of high molecular weight polyethylene or polyethylene having a low melt flow rate (MFR), there is therefore the problem that the catalysts can be activated only at comparatively low temperatures and therefore have only a low activity. It is also known that the addition of further transition metals can exert a positive influence both on the activity and, for example, on the molecular weight, the molecular weight distribution or the melt flow rate (MFR). On this subject, see, for example, Advances in Catalysis, Vol. 33, page 62 ff.

It is known from U.S. Pat. No. 5,032,651 that a mixed Phillips catalyst based on chromium and zirconium can be supported on aluminum oxide or aluminum phosphate. Here, the two elements are preferably immobilized on separate supports and mixed before or during the polymerization or alternatively are deposited on a single support. The zirconium is applied in the form of organic zirconium compounds to the support and used in the polymerization. Calcination of the organozirconium compound is not envisaged.

Furthermore, U.S. Pat. No. 4,128,500 discloses the use of a zirconium-modified silicon dioxide support which is, after a treatment at from about 650 to 850° C., treated with a solution of an organic Cr(III) compound and subsequently calcined. This process requires, firstly, a two-fold thermal treatment and, secondly, gives catalysts having productivities of less than 5000 g/g. Due to the high calcination temperatures which are necessary to achieve sufficient activity, the molar masses are not sufficiently high. Rather, it can be seen from U.S. Pat. No. 4,128,500 that the addition of zirconium decreases the molar masses or increases the MFR.

It was accordingly an object of the present invention to overcome the abovementioned disadvantages of the prior art and to provide a Phillips catalyst which displays a very good activity and productivity even at low activation temperatures in order to prepare a high molecular weight polyethylene. Furthermore, the catalyst should give a high molecular weight polymer product having high pour densities.

This object is achieved by a catalyst for the polymerization and/or copolymerization of olefins which is obtainable by application to a finely divided inorganic support and concluding calcination at temperatures of from 350 to 1050° C. and has a chromium content of from 0.1 to 5% by weight and a zirconium content of from 0.5 to 10% by weight, in each case based on the element in the finished catalyst, with the molar ratio of chromium to zirconium being from 0.6 to 5.

The present invention further provides a process for preparing ethylene polymers using the catalysts of the invention.

Finally, the invention provides ethylene homopolymers and copolymers which are obtainable using the catalysts of the invention, and also fibers, films and moldings comprising these ethylene homopolymers and copolymers.

The ethylene polymers which can be prepared using the catalysts of the invention have a high activity and productivity even at low activation temperatures and produce high molecular weight polymers even at high calcination temperatures. The polymers have, in particular, a high pour density and a high intrinsic viscosity or high molar mass. Furthermore, the polymers prepared using the catalysts of the invention display an excellent balance of ESCR, HLMI drop and impact toughness.

One important aspect of the catalysts of the invention is that the chromium content is from 0.1 to 5% by weight, preferably from 0.2 to 2% by weight, particularly preferably from 0.3 to 1.5% by weight, and the zirconium content is from 0.5 to 10% by weight, preferably from 0.5 to 5% by weight, particularly preferably from 1 to 5% by weight, in particular from 2 to 4% by weight. The chromium or zirconium content specified here is the ratio of the mass of respective elements to the total mass of the finished catalyst.

It has surprisingly been found that the catalyst has to have a particular minimum zirconium to chromium ratio for high molecular weight polymer products having a high molar mass and a reduced MFR to be obtained. This is contrary to the disclosure of U.S. Pat. No. 4,128,500, whose objective is to obtain products having a relatively high MFR. According to the invention, therefore, the molar ratio of zirconium to chromium in the catalyst has to be at least 0.6. A distinct excess of zirconium of more than 5 is likewise not desirable. Preference is given to a zirconium to chromium ratio of from 0.7 to 3, particularly preferably from 0.75 to 2.5, more particularly preferably from 0.8 to 2, in particular from 0.9 to 1.5.

In the catalyst of the invention, chromium and zirconium are present in supported form on a finely divided inorganic support. One constituent of the catalyst of the invention is therefore the finely divided inorganic support material, in particular an inorganic solid, which is usually porous. Preference is given to oxidic support materials which may still contain hydroxy groups. The inorganic metal oxide can be spherical or granular. Examples of solids of this type, which are otherwise known to those skilled in the art, are aluminum oxide, silicon dioxide (silica gel), titanium dioxide or their mixed oxides or cogels, or aluminum phosphate. Further suitable support materials can be obtained by modifying the pore surface area, e.g. by means of compounds of the elements boron (BE-A-861,275), aluminum (U.S. Pat. No. 4,284,527), silicon (EP-A 0 166 157) or phosphorus (DE-A 36 35 710). Preference is given to using a silica gel. Preference is given to spherical or granular silica gels and also silica-based cogels.

The preparation of the support is not restricted to a particular procedure. Rather, all known preparative methods can be used for preparing the support for the catalyst of the invention.

An important aspect of the catalyst of the present invention is that a concluding calcination at temperatures of from 350 to 1050° C. is carried out. For the purposes of the present invention, "concluding" means that the calcination is carried out on the support which has finished being doped, i.e. after application of the chromium compound and the zirconium compound to the support, with further after-treatments of the calcined catalyst, for example reduction of the Cr(VI) by means of CO or the like, not being ruled out. However, application of the zirconium compounds only in the furnace used for the calcination should not be ruled out, but the addition of the zirconium compound always takes place at below the actual final calcination temperature.

The chromium and the zirconium can in principle be applied in any order, but preference is given to the chromium being applied first and the zirconium then being applied or particularly preferably both being applied simultaneously.

The catalyst of the invention is preferably obtainable by applying a chromium compound and a zirconium compound by means of a polar organic solvent. For the purposes of the present invention, polar solvents are solvents which have a permanent dipole moment. The preferred polar solvents therefore comprise, in addition to a carbon-containing skeleton, electronegative elements of groups 15, 16 and/or 17, in particular oxygen, nitrogen or chlorine, without being restricted thereto. The solvent can be protic or aprotic.

A preferred process for preparing the catalyst of the invention comprises the steps
(a) preparing an inorganic, finely divided and porous support,
(b) applying a chromium compound to the support,
(c) applying a zirconium compound to the support, with the steps b) and c) being able to be carried out together or separately in any order,
(d) if appropriate, removing the solvent from the solid and
(e) calcining the solid at temperatures of from 350 to 950° C., preferably from 400 to 900° C., under oxidative conditions.

Particular preference is given to a process consisting of the abovementioned steps.

In step (a) of the process for preparing the catalyst of the invention, a support is prepared. Preference is given to oxidic support materials which may still contain hydroxy groups. The inorganic metal oxide can be spherical or granular. Examples of solids of this type, which are otherwise known to those skilled in the art, are aluminum oxide, silicon dioxide (silica gel), titanium dioxide or their mixed oxides or cogels, or aluminum phosphate. Further suitable support materials can be obtained by modifying the pore surface area, e.g. by means of compounds of the elements boron (BE-A-861,275), aluminum (U.S. Pat. No. 4,284,527), silicon (EP-A 0 166 157) or phosphorus (DE-A 36 35 710). Preference is given to using a silica gel. Preference is given to spherical or granular silica gels, with the former also being able to be spray dried.

Preferred support materials are finely divided silica xerogels, which can be prepared, for example, as described in DE-A 25 40 279.

Further advantageous supports are those described in WO 97/48743. These are fragile, agglomerated catalyst support particles which have a mean particle size of from 2 μm to 250 μm and a specific surface area of from 1 $m^2/g$ to 1000 $m^2/g$ and are prepared by spray drying primary particles having a mean particle size of from 3 μm to 10 μm. The primary particles for producing the agglomerated catalyst support particles are formed on the basis of a slurry of dry- and optionally wet-milled inorganic oxide particles in water.

Particularly advantageous supports can be prepared from a hydrogel by means of the steps
i) preparing a hydrogel;
ii) milling the hydrogel to give a finely particulate hydrogel in which at least 5% by volume of the particles, based on the total volume of the particles, have a particle size in the range from >0 μm to ≦3 μm; and/or at least 40% by volume of the particles, based on the total volume of the particles, have a particle size in the range from >0 μm to ≦12 μm, and/or at least 75% by volume of the particles, based on the total volume of the particles, have a particle size in the range from >0 μm to ≦35 μm;
iii) producing a slurry based on the finely particulate hydrogel;
iv) drying the slurry comprising the finely particulate hydrogel to give the support for catalysts.

After step iii), xerogels can also additionally be added.

In step ii) they are preferably hydrogel particles and not xerogel particles or oxide particles. Figures given for particle size, diameter or mean particle size are based on hydrogel particles.

Hydrogels are water-containing gels of inorganic hydroxides, preferably hydroxides based on silicon, which are in the form of a three-dimensional network. Xerogels are gels from which water has been removed, for example by solvent exchange or drying, so that the water content of the gel is less than 40% by weight, based on the total weight of the gel. The water content of the hydrogel is preferably at least 80% by weight, preferably at least 90% by weight, based on the total weight of the hydrogel.

The term "hydrogel" refers to all hydrogels which are suitable for producing supports, preferably hydrogels based on inorganic oxides. The term "hydrogel" preferably refers to hydrogels based on silicon-containing starting materials, more preferably hydrogels based on silica.

The preparation of a silica hydrogel is preferably carried out by acidic or basic precipitation from water glass. The hydrogel is preferably prepared by introducing a sodium or potassium water glass solution into a rotating stream of a mineral acid, e.g. sulfuric acid. The silica hydrosol formed is subsequently sprayed into a gaseous medium by means of a nozzle. The end of the nozzle used for this leads, after solidification of the hydrosol in the gaseous medium, to hydrogel particles having a mean particle size which can be varied in a range from, for example, 1 mm to 20 mm by selection of the nozzle. The hydrogel particles preferably have a mean particle diameter in the range from 2 mm to 10 mm, more preferably in the range from 5 mm to 6 mm. Washing of the hydrogel particles can be carried out in any desired way, preferably by means of weakly ammoniacal water at about 50° C.-80° C. in a continuous countercurrent process. The spherical hydrogel particles can be sieved and fractions having a preferred diameter can be isolated.

Apart from spraying of a hydrosol, other methods of preparing the hydrogel which are known in the prior art can likewise be used. For example, hydrogels, preferably silica hydrogels, which can be prepared in a manner known from the prior art, for example from silicon-containing starting materials such as alkali metal silicates, alkyl silicates and/or alkoxysilanes, can likewise be used for preparing suitable supports.

The size of hydrogel particles which can be used can vary in a wide range, for example in a range from a few microns to a few centimeters. The size of hydrogel particles which can be used is preferably in the range from 1 mm to 20 mm, but hydrogel cakes can likewise be used. It can be advantageous to use hydrogel particles which have a size in the range $\leq 6$ mm. These are obtained, for example, as by-product in the production of granular supports.

Hydrogels which can be prepared according to step i) are preferably largely spherical. Hydrogels which can be prepared according to step i) also preferably have a smooth surface. Silica hydrogels which can be prepared according to step i) preferably have a solids content in the range from 10% by weight to 25% by weight, preferably in the region of 17% by weight, calculated as $SiO_2$.

In step ii), a finely particulate hydrogel having a solids content in the range from >0% by weight to $\leq 25$% by weight, preferably from 5% by weight to 15% by weight, more preferably in the range from 8% by weight to 13% by weight, particularly preferably in the range from 9% to weight to 12% by weight, very particularly preferably in the range from 10% by weight to 11% by weight, calculated as oxide, is preferably produced. A finely particulate silica hydrogel having a solids content in the range from >0% by weight to $\leq 25$% by weight, preferably from 5% by weight to 15% by weight, more preferably in the range from 8% by weight to 13% by weight, particularly preferably in the range from 9% by weight to 12% by weight, very particularly preferably in the range from 10% by weight to 11% by weight, calculated as $SiO_2$, is particularly preferably produced in step ii). The solids content is preferably set by dilution, for example by addition of deionized water.

The hydrogel is milled to a finely particulate hydrogel, with the hydrogel being milled to very fine particles.

The advantages of the support which can be prepared from milled hydrogel particles are that the support preferably has a compact microstructure. Without being tied to a particular theory, it is assumed that the hydrogel particles can pack together in a high packing density in the formation of the support.

Catalyst systems comprising supports preparable from hydrogel particles which can be produced according to step ii) advantageously have a particularly good productivity.

The finely particulate hydrogel has a preferred distribution of the particle sizes when at least 75% by volume, preferably at least 80% by volume, more preferably at least 90% by volume, of the hydrogel particles, based on the total volume of the particles, have a particle size in the range from >0 μm to $\leq 35$ μm, with preference in the range from >0 μm to $\leq 30$ μm, with greater preference in the range from >0 μm to $\leq 25$ μm, preferably in the range from >0 μm to $\leq 20$ μm, more preferably in the range from >0 μm to $\leq 18$ μm, even more preferably in the range from >0 μm to $\leq 16$ μm, particularly preferably in the range from >0 μm to $\leq 15$ μm, more particularly preferably in the range from >0 μm to $\leq 14$ μm, very particularly preferably in the range from >0 μm to $\leq 13$ μm, especially in the range from >0 μm to $\leq 12$ μm, more especially in the range from >0 μm to $\leq 11$ μm.

The finely particulate hydrogel has a more preferred distribution of the particle sizes when at least 75% by volume, preferably at least 80% by volume, more preferably at least 90% by volume, of the hydrogel particles, based on the total volume of the particles, have a particle size in the range from $\geq 0.1$ μm to $\leq 35$ μm, with preference in the range from $\geq 0.1$ μm to $\leq 30$ μm, with greater preference in the range from $\geq 0.1$ μm to $\leq 25$ μm, preferably in the range from $\geq 0.1$ μm to $\leq 20$ μm, more preferably in the range from $\geq 0.1$ μm to $\leq 18$ μm, even more preferably in the range from $\geq 0.1$ μm to $\leq 16$ μm, particularly preferably in the range from $\geq 0.1$ μm to $\leq 15$ μm, more particularly preferably in the range from $\geq 0.1$ μm to $\leq 14$ μm, very particularly preferably in the range from $\geq 0.1$ μm to $\leq 13$ μm, especially in the range from $\geq 0.1$ μm to $\leq 12$ μm, more especially in the range from $\geq 0.1$ μm to $\leq 11$ μm.

The finely particulate hydrogel has a particularly preferred distribution of the particle sizes when at least 75% by volume, preferably at least 80% by volume, more preferably at least 90% by volume, of the hydrogel particles, based on the total volume of the particles, have a particle size in the range from $\geq 0.2$ μm to $\leq 35$ μm, with preference in the range from $\geq 0.2$ μm to $\leq 30$ μm, with greater preference in the range from $\geq 0.2$ μm to $\leq 25$ μm, preferably in the range from $\geq 0.2$ μm to $\leq 20$ μm, more preferably in the range from $\geq 0.2$ μm to $\leq 18$ μm, even more preferably in the range from $\geq 0.2$ μm to $\leq 16$ μm, particularly preferably in the range from $\geq 0.2$ μm to $\leq 15$ μm, more particularly preferably in the range from $\geq 0.2$ μm to $\leq 14$ μm, very particularly preferably in the range from $\geq 0.2$ μm to $\leq 13$ μm, especially in the range from $\geq 0.2$ μm to $\leq 12$ μm, more especially in the range from $\geq 0.2$ μm to $\leq 11$ μm.

The supports which can be produced from the hydrogel particles have a high homogeneity. A high homogeneity of the support can lead to the application of a catalyst to the support likewise being able to be carried out with high homogeneity and the polymerization products being able to have relatively high molecular weights.

The finely particulate hydrogel preferably has a narrow distribution of the particle sizes. For example, at least 40% by volume, preferably at least 50% by volume, of the hydrogel particles, based on the total volume of the particles, can have a particle size in the range from >0 μm to $\leq 10$ μm, preferably in the range from >0 μm to $\leq 8$ μm, more preferably in the range from >0 μm to $\leq 7$ μm, particularly preferably in the range from >0 μm to $\leq 6.5$ μm, more particularly preferably in the range from >0 μm to $\leq 6$ μm, very particularly preferably in the range from >0 μm to $\leq 5.5$ μm, especially in the range from >0 μm to $\leq 5$ μm, more especially in the range from >0 μm to $\leq 4.5$ μm.

Furthermore, preference is given to at least 40% by volume, preferably at least 50% by volume, of the hydrogel particles, based on the total volume of the particles, having a particle size in the range from $\geq 0.1$ μm to $\leq 10$ μm, preferably in the range from $\geq 0.1$ μm to $\leq 8$ μm, more preferably in the range from $\geq 0.1$ μm to $\leq 7$ μm, particularly preferably in the range from ≧0.1 μm to ≦6.5 μm, more particularly preferably in the range from ≧0.1 μm to ≦6 μm, very particularly preferably in the range from ≧0.1 μm to ≦5.5 μm, especially in the range from ≧0.1 μm to ≦5 μm, more especially in the range from ≧0.1 μm to ≦4.5 μm.

Advantageously, preference is given to at least 40% by volume, preferably at least 50% by volume, of the hydrogel particles, based on the total volume of the particles, having a particle size in the range from ≧0.2 μm to ≦10 μm, preferably in the range from ≧0.2 μm to ≦8 μm, more preferably in the range from ≧0.2 μm to ≦7 μm, particularly preferably in the range from ≧0.2 μm to ≦6.5 μm, more particularly preferably in the range from ≧0.2 μm to ≦6 μm, very particularly preferably in the range from ≧0.2 μm to ≦5.5 μm, especially in the range from ≧0.2 μm to ≦5 μm, more especially in the range from ≧0.2 μm to ≦4.5 μm.

It is advantageous for at least 5% by volume, preferably at least 7.5% by volume, particularly preferably at least 10% by volume, of the hydrogel particles, based on the total volume of the particles, to have a particle size in the range from >0 μm to ≦2.8 μm, particularly preferably from >0 μm≦2.5 μm. It is particularly advantageous for at least 5% by volume, preferably at least 7.5% by volume, particularly preferably at least 10% by volume, of the hydrogel particles, based on the total volume of the particles, to have a particle size in the range from >0 μm to ≦2.4 μm, preferably in the range from >0 μm to ≦2.2 μm, particularly preferably in the range from >0 μm to ≦2.0 μm, with preference in the range from >0 μm to ≦1.8 μm, preferably in the range from >0 μm to ≦1.6 μm, particularly preferably in the range from >0 μm to ≦1.5 μm.

It is more advantageous for at least 5% by volume, preferably at least 7.5% by volume, particularly preferably at least 10% by volume, of the hydrogel particles, based on the total volume of the particles, to have a particle size in the range from ≧0.1 μm to ≦2.8 μm, particularly preferably from ≧0.1 μm≦2.5 μm. It is particularly advantageous for at least 5% by volume, preferably at least 7.5% by volume, particularly preferably at least 10% by volume, of the hydrogel particles, based on the total volume of the particles, to have a particle size in the range from ≧0.1 μm to ≦2.4 μm, preferably in the range from ≧0.1 μm to ≦2.2 μm, particularly preferably in the range from ≧0.1 μm to ≦2.0 μm, with preference in the range from ≧0.1 μm to ≦1.8 μm, preferably in the range from ≧0.1 μm to ≦1.6 μm, particularly preferably in the range from ≧0.1 μm to ≦1.5 μm.

It is particularly advantageous for at least 5% by volume, preferably at least 7.5% by volume, particularly preferably at least 10% by volume, of the hydrogel particles, based on the total volume of the particles, to have a particle size in the range from ≧0.2 μm to ≦2.8 μm, particularly preferably from ≧0.2 μm≦2.5 μm. It is particularly advantageous for at least 5% by volume, preferably at least 7.5% by volume, particularly preferably at least 10% by volume, of the hydrogel particles, based on the total volume of the particles, to have a particle size in the range from ≧0.2 μm to ≦2.4 μm, preferably in the range from ≧0.2 μm to ≦2.2 μm, particularly preferably in the range from ≧0.2 μm to ≦2.0 μm, with preference in the range from ≧0.2 μm to ≦1.8 μm, preferably in the range from ≧0.2 μm to ≦1.6 μm, particularly preferably in the range from ≧0.2 μm to ≦1.5 μm. Particularly advantageously, at least 10% by volume of the hydrogel particles, based on the total volume of the particles, have a particle size in the range from ≧0.5 μm to ≦3 μm, more preferably in the range from ≧0.5 μm to ≦2.5 μm.

In step ii), preference is given to producing a finely particulate hydrogel which has a preferably narrow distribution of the particle sizes with at least 10% by volume of the particles, based on the total volume of the particles, having a particle size in the range from >0 μm to ≦2.5 μm, with preference in the range from >0 μm to ≦2.0 μm, preferably in the range from >0 μm to ≦1.8 μm, particularly preferably in the range from >0 μm to ≦1.6 μm; and/or at least 50% by volume of the particles, based on the total volume of the particles, having a particle size in the range from >0 μm to ≦8 μm, with preference in the range from >0 μm to ≦7 μm, preferably in the range from >0 μm to ≦5 μm, particularly preferably in the range from >0 μm to ≦4 μm, and/or at least 90% by volume of the particles, based on the total volume of the particles, having a particle size in the range from >0 μm to ≦21 μm, with preference in the range from >0 μm to ≦16 μm, preferably in the range from >0 μm to ≦14 μm, particularly preferably in the range from >0 μm to ≦12 μm.

Furthermore, at least 5% by volume of the particles, based on the total volume of the particles, can have a particle size in the range ≧2 μm; and/or at least 10% by volume of the particles, based on the total volume of the particles, can have a particle size in the range ≧1 μm.

The hydrogel can have a mean particle size in the range from ≧1 μm to ≦8 μm. The hydrogel preferably has a mean particle size in the range from ≧1.2 μm to ≦6 μm, more preferably in the range from ≧1.5 μm to ≦5 μm, particularly preferably in the range from ≧2 μm to ≦4 μm.

The particle sizes indicated relate to hydrogel particles, preferably not to particles of a gel from which water has been removed or an oxide. The size of the hydrogel particles can be reduced by drying of a gel to one tenth of the size of the undried hydrogel. The indicated size of the hydrogel particles preferably relates to a hydrogel from which no water has been removed up to the point when it is milled. The particle size indicated preferably does not relate to particles which have been formed from the slurry of inorganic oxides, oxide-hydroxides and/or xerogels in water or another solvent. The indicated sizes of the hydrogel particles thus preferably relate to particles which differ significantly from the particles used in the prior art.

In step ii), a hydrogel is preferably milled. During this milling step, the hydrogel preferably contains no additions of oxides and/or xerogels. The hydrogel is preferably milled moist and/or wet to form a finely particulate hydrogel. Moist or wet milling refers to milling of a hydrogel which has preferably not been dried up to the point of milling and/or from which preferably no water has been removed prior to milling. Furthermore, the milling conditions are selected so that preferably no water is removed from the hydrogel during the milling process. The hydrogel is preferably not dry milled in step ii) and/or preferably no dry-milled hydrogel, xerogel, oxide, oxide-hydroxide and/or mixtures thereof is added in step ii).

For the purposes of the present invention, the term "oxide-hydroxides" refers to compounds which have a lower water content than a hydrogel without the water having been removed from the compound to such an extent as to form the corresponding oxide.

The milling of the hydrogel can be carried out in a suitable mill, for example a pin mill or an impingement plate mill; the hydrogel is preferably milled wet in a stirred ball mill. The milling of the hydrogel can be carried out in one step and/or in one mill or in a plurality of steps and/or various mills. Before the hydrogel is milled finely, the hydrogel can be precomminuted or premilled.

The advantageous properties of the support for catalysts result from the milling of the hydrogel particles. The supports which can be prepared by the process of the invention lead, after application of catalyst compounds, to supported catalysts which, in preferred embodiments, have a surprisingly high productivity. This is particularly surprising since according to conventional teachings very small, finely milled hydrogel particles lead to support particles which have a very high packing density, which would cause a decrease in the productivity of the catalyst.

The finely particulate hydrogel particles can be sieved after milling. The finely particulate hydrogel is used to produce a slurry comprising finely particulate moist hydrogel, preferably silica hydrogel. The production of a slurry can, for example, encompass adjustment of the solids content, adjustment of the pH, adjustment of the viscosity, addition of hydroxides, oxide-hydroxides, oxides and/or salts, additives and/or fillers.

Inorganic hydroxides, oxide-hydroxides and/or oxides suitable for the abovementioned process are, for example, selected from the group consisting of hydroxides, oxide-hydroxides and oxides of silicon, aluminum, titanium, zirconium and/or one of the metals of main group I and II of the Periodic Table and mixtures thereof. Inorganic hydroxides, oxide-hydroxides, oxides and/or salts, preferably ones selected from the group consisting of $SiO_2$, $Al_2O_3$, MgO, $AlPO_4$, $TiO_2$, $ZrO_2$, $Cr_2O_3$ and mixtures thereof, are preferably added to the slurry in step iii). Very particular preference is given to inorganic hydroxides, oxide-hydroxides, oxides and/or salts selected from the group consisting of $Al_2O_3$, AlOOH, $AlPO_4$ and $ZrO_2$. Preference is also given to magnesium oxide and/or sheet silicates. It is also possible to use mixed oxides such as aluminum silicates or magnesium silicates. It is possible to add freshly preparable hydroxides, oxide-hydroxides, oxides and/or salts, but also commercially available compositions. Preference is given to adding wet-milled inorganic hydroxides, oxide-hydroxides and/or oxides to the aqueous slurry. It can also be provided for the aqueous slurry to be produced in step iii) without addition of dry-milled inorganic oxides selected from the group consisting of $SiO_2$, $Al_2O_3$, MgO, $AlPO_4$, $TiO_2$, $ZrO_2$, $Cr_2O_3$ and mixtures thereof.

The proportion of hydroxides, oxide-hydroxides, oxides and/or salts added can vary within a wide range. The proportion of hydroxides, oxide-hydroxides, oxides and/or salts added is preferably in the range from 1% by weight to 70% by weight, based on the total solids content of the slurry. Preference is given to adding inorganic hydroxides, oxide-hydroxides, oxides and/or salts in amounts in the range $\leq 10\%$ by weight, preferably $\leq 5\%$ by weight, particularly preferably $\leq 2\%$ by weight, based on the total solids content, to the slurry in step iii). Aluminum compounds can advantageously be added in higher proportions by weight.

It is preferred that compounds of aluminum, for example AlOOH (pseudoboehmite), $AlPO_4$, and/or $Al_2O_3$, are added to the slurry. Preference is given to adding AlOOH in an amount in the range from 1% by weight to 30% by weight, preferably in the range from 5% by weight to 20% by weight, based on the total solids content, to the slurry in step iii). Further preference is given to adding AlOOH in an amount in the range from 3% by weight to 18% by weight, preferably in the range from 5% by weight to 15% by weight, more preferably in the range from 6% by weight to 12% by weight, particularly preferably in the range from 6% by weight to 10% by weight, based on the total solids content, to the slurry.

The percentage by weight reported in relation to the addition of hydroxide compounds, in particular AlOOH, unless indicated otherwise, is calculated on the basis of the oxide, in particular $Al_2O_3$, based on the total solids content calculated as oxide.

Furthermore, $Al_2O_3$ in an amount in the range from 1% by weight to 30% by weight, preferably in the range from 5% by weight to 20% by weight, based on the total solids content, can be added to the slurry in step iii). Further preference is given to adding $Al_2O_3$ in amount in the range from 3% by weight to 18% by weight, preferably in the range from 5% by weight to 15% by weight, more preferably in the range from 6% by weight to 12% by weight, particularly preferably in the range from 6% by weight to 10% by weight, based on the total solids content, to the slurry. Aluminum compounds can, for example, be added in the form of the commercially available products Pural SB, Disperal and/or Apyral, obtainable from the companies Sasol Ltd. and Nabaltec GmbH.

$AlPO_4$ can be added to the slurry in widely varying proportions by weight, for example in the range from 30% by weight to 70% by weight, based on the total solids content.

Furthermore, hydroxides, oxide-hydroxides and/or oxides of zirconium, for example zirconium hydroxide and/or $ZrO_2$, can be added to the slurry. Zirconium hydroxide and/or $ZrO_2$ are preferably milled wet. $ZrO_2$ in amount in the range from 1% by weight to 10% by weight, preferably in the range from 2% by weight to 6% by weight, based on the total solids content, can advantageously be added to the slurry.

The addable hydroxides, oxide-hydroxides and/or oxides added are preferably milled wet. Furthermore, the hydroxides, oxide-hydroxides and/or oxides preferably have a mean particle size in the range from 1 µm to 10 µm. The hydroxides, oxide-hydroxides and/or oxides can be milled separately, preferably wet, but it can also be provided for the slurry comprising the finely milled hydrogel and hydroxides, oxide-hydroxides and/or oxides which can optionally be added to be milled again in step iii), preferably milled wet. The milling of the slurry can be repeated a number of times.

An aqueous slurry is preferably produced in step iii), but the solvent of the slurry can be replaced at least partly; for example, the aqueous slurry can comprise organic solvents, for example aliphatic alcohols, preferably toluene and/or a methanol/glycerol mixture. Replacement of the solvent of the slurry preferably comprises replacement of up to 50% by volume, based on the total volume of the slurry, of water. The slurry preferably has a water content of at least 50% by weight, based on the total weight of the slurry. Spray drying of the support particles is, for example, preferably carried out from an aqueous solution, but it can be advantageous to replace at least part of the solvent prior to spray drying.

The pH of the slurry can vary, preferably the pH of the slurry is in the neutral to basic range. The pH of the slurry can advantageously be adjusted to a value in the range from 8 to 11; and the pH of the slurry after adjustment is preferably in the range from 8 to 10. The adjustment of the pH of the slurry can be, effected by means of suitable acids or bases; the pH of the slurry is preferably adjusted by means of $NH_4OH$.

The viscosity of the slurry in step iii) can advantageously be modified. The viscosity of the slurry can be increased, for example, by addition of compounds of the alkaline earth metals, preferably compounds selected from the group consisting of hydroxides and oxides of alkaline earth metals, for example compounds selected from the group consisting of magnesium hydroxide, calcium hydroxide, magnesium oxide and calcium oxide. Preference is given to adding $Ca(OH)_2$ and/or $Mg(OH)_2$ in an amount in the range from 1% by weight to 10% by weight, preferably in the range from 2% by weight to 4% by weight, based on the total solids content, to the slurry in step iii). The viscosity of the slurry is, for example, of importance for the particle size of the support particles which can be produced by spray drying.

It can also be provided for a binder which aids the particle formation process, for example during spray drying, and/or improves the coherence of the particles to be added. As binders, it is possible to use particularly fine, e.g. colloidal, particles of inorganic oxides. However, auxiliaries, for example polymers such as cellulose derivatives, polystyrene and/or polymethyl methacrylate, can also be added as binders. It is advantageous to add hydroxymethylcellulose, preferably in an amount in the range from 0.1% by weight to 10% by weight, particularly preferably in the range from 1% by weight to 2% by weight, based on the total solids content, to the slurry in step iii).

The solids content of the slurry is important for the preparation of the support for catalysts. It is usual to use high solids contents in the range from 10% by weight to 25% by weight, based on the total weight. The solids content of the slurry is set to $\leq$20% by weight, preferably $\leq$15% by weight, more preferably $\leq$12% by weight, particularly preferably $\leq$10% by weight, more particularly preferably in the range from 5% by weight to 10% by weight, very particularly preferably in the range from 8% by weight to 10% by weight, based on the total weight, in step iii) prior to drying.

A low solids content of the slurry surprisingly leads to support particles which have particularly advantageous particle diameters.

The size of the particles prior to drying can be monitored again; for example, the slurry can be filtered and/or sieved, for example via a sieve of suitable size.

The order of the process steps i) to iv) is not restricted to the order described, but it is preferred that the steps are carried out in the order indicated.

The drying of the slurry comprising the finely particulate hydrogel to give the support is preferably carried out by spray drying. However, it can also be preferred for drying to be carried out by other methods, for example by thermal drying, drying under reduced pressure and/or by extraction of the water by means of an organic solvent. Furthermore, drying of the slurry comprising the finely particulate hydrogel can also be carried out by means of a combination of suitable methods. Furthermore, for example, the spray-dried support particles can additionally be dried thermally. The drying of the slurry comprising the finely particulate hydrogel can preferably be carried out by means of spray drying.

The support particles can preferably be produced by spray drying the slurry comprising the finely particulate hydrogel. The conditions of spray drying can be varied within wide limits. The properties of the support particles after spray drying are largely determined by the properties of the slurry, so that the individual spray-drying parameters are largely noncritical for the properties of the support. The setting of the spray-drying parameters to achieve the desired properties of the support particles, e.g. temperature, amount of gas, a gas entry and exit temperature and/or initial and final moisture content, are known to those skilled in the art and are selected according to the properties of the apparatus.

The support particles which can preferably be produced by means of spray drying generally have a spheroidal, i.e. sphere-like, shape. The desired mean particle size of the supports after spray drying can be varied within a wide range and can be matched appropriately to the use of the supports. The mean particle size of the supports can thus be set, for example, to suit various polymerization processes.

The support particles which can preferably be produced by means of spray drying preferably have a mean particle size in the range from 1 μm to 350 μm, preferably in the range from 30 μm to 150 μm and particularly preferably in the range from 40 μm to 100 μm. The support particles which can preferably be produced by means of spray drying particularly preferably have a mean particle size in the range from 30 μm to 90 μm, more preferably in the range from 40 μm to 70 μm, especially in the range from 40 μm to 50 μm and very particularly preferably in the range from 40 μm to 55 μm.

Particular preference is given to from 70% by volume to 90% by volume of the support particles, preferably 80% by volume of the particles, based on the total volume of the particles, having a mean particle size in the range from $\geq$40 μm to $\leq$90 μm.

Support particles which can preferably be used for polymerization in slurry polymerization processes can preferably have mean particle sizes up to 350 μm; they preferably have a mean particle size in the range from 30 μm to 150 μm. Support particles which can preferably be used for polymerization in gas-phase fluidized-bed processes preferably have a mean particle size in the range from 30 μm to 120 μm. Support particles which can preferably be used for polymerization in suspension processes preferably have a mean particle size in the range from 30 μm to 300 μm. Support particles which can preferably be used for polymerization in loop processes preferably have a mean particle size in the range from 30 μm to 150 μm. Support particles which can, for example, be used for polymerization in fixed-bed reactors advantageously have mean particle sizes of $\geq$100 μm, preferably $\geq$300 μm, more preferably in the range from 1 mm to 10 mm, particularly preferably in the range from 2 mm to 8 mm and even more preferably in the range from 2.5 mm to 5.5 mm.

Preference is given to from 10% by volume to 90% by volume of the support particles which can be produced in step iv), based on the total volume of the particles, having a particle size in the range from $\geq$40 μm to $\leq$120 μm; it is preferred that from 30% by volume to 80% by volume of the particles, based on the total volume of the particles, have a particle size in the range from $\geq$30 μm to $\leq$70 μm. Preference is given to particle sizes of the support particles in the range from $\geq$30 μm to $\leq$70 μm.

Support particles which can be produced in step iv) preferably have a distribution of the particle sizes, in particular of the output from the spray tower, in which $\geq$90% by volume, based on the total volume of the particles, is made up of particles having a size in the range from $\geq$16 μm to $\leq$500 μm, $\geq$75% by volume of the particles is made up of particles having a size in the range from $\geq$32 μm to $\leq$200 μm and a 30% by volume of the particles is made up of particles having a size in the range from $\geq$48 μm to $\leq$150 μm.

The support particles after drying, in particular after spray drying, particularly advantageously have a low fines content. For the purposes of the present invention, the fines content of the support particles is the proportion of support particles which have a particle size of less than 25 μm, preferably less than 22 μm, particularly preferably less than 20.2 μm. It is advantageous for less than 5% by volume of the particles after drying, based on the total volume of the particles, to have a particle size in the range from >0 μm to $\leq$25 μm, preferably in the range from >0 μm to $\leq$22 μm, particularly preferably in the range from >0 μm to $\leq$20.2 μm. Preference is given to less than 3% by volume, particularly preferably less than 2% by volume, of the particles, based on the total volume of the particles, having a particle size in the range from >0 μm to $\leq$25 μm, preferably in the range from >0 μm to $\leq$22 μm, particularly preferably in the range from >0 μm to $\leq$20.2 μm. It is preferred that less than 5% by volume, preferably less than 2% by volume, of the particles, based on the total volume of the particles, have a particle size in the range from >0 μm to $\leq$10 μm.

Furthermore, preference is given to less than 30% by volume, preferably less than 20% by volume, particularly preferably less than 15% by volume, very particularly preferably less than 10% by volume, of the particles, based on the total volume of the particles, having a particle size in the range from >0 µm to ≦35 µm, preferably in the range from >0 µm to ≦32 µm.

A high fines content in the support particles subsequently leads to a proportion of fine dust in the polymers produced using these supports. Thus, a great advantage of the supports described results from the support particles having a low fines content, in particular after spray drying.

The support particles prepared by this process have a pore volume which is preferably in the range below 1.6 ml/g, more preferably in the range below 1.2 ml/g, particularly preferably in the range from 0.8 ml/g to 1.25 ml/g.

The support particles prepared have a pore diameter which is preferably in the range below 200 Å, more preferably in the range below 150 Å, particularly preferably in the range from 50 Å to 130 Å.

Catalysts based on granular supports frequently have a lower productivity compared to spray-dried supports. Furthermore, granular supports often have a higher strength than spray-dried supports. The surprising advantage of the supports prepared by this process compared to granular supports is that they display, in particularly preferred embodiments, a higher catalytic activity than granular supports at a comparable strength.

The surface area of the inorganic support can likewise be varied within a wide range by means of the drying process, in particular the spray drying process. Preference is given to producing particles of the inorganic support, in particular a product from a spray tower, which have a surface area in the range from 100 $m^2$/g to 1000 $m^2$/g, preferably in the range from 150 $m^2$/g to 700 $m^2$/g and particularly preferably in the range from 200 $m^2$/g to 500 $m^2$/g. Supports which can be used for the polymerization preferably have a surface area in the range from 200 $m^2$/g to 500 $m^2$/g/. The specific surface area of the support particles is the surface area of the support particles determined by means of nitrogen adsorption in accordance with the BET technique.

The apparent density of the inorganic supports for catalysts is preferably in the range from 250 g/l to 1200 g/l, with the apparent density being able to vary as a function of the water content of the support. The apparent density of water-containing support particles is preferably in the range from 500 g/l to 1000 g/l, more preferably in the range from 600 g/l to 950 g/l and particularly preferably in the range from 650 g/l to 900 g/l. In the case of supports which contain very little if any water, the apparent density is preferably from 250 g/l to 600 g/l.

The support is preferably prepared on the basis of a silica hydrogel. The support therefore preferably comprises a high proportion of $SiO_2$. Preference is given to the silicon content of the support being in the range ≧10% by weight, preferably in the range ≧15% by weight, more preferably in the range ≧20% by weight, particularly preferably in the range ≧25% by weight, more particularly preferably in the range ≧30% by weight, especially in the range ≧40% by weight, very particularly preferably in the range ≧50% by weight, based on the total weight of the support.

Aluminum can be added to the slurry based on the finely particulate hydrogel, preferably silica hydrogel, preferably in the form of compounds selected from the group consisting of $Al_2O_3$, $AlPO_4$ and AlOOH. Preference is given to the aluminum content of the support being in the range ≧5% by weight, preferably in the range ≧10% by weight, more preferably in the range ≧15% by weight, more preferably in the range ≧20% by weight, particularly preferably in the range ≧25% by weight, even more particularly preferably in the range ≧30% by weight, especially in the range ≧40% by weight, very particularly preferably in the range ≧50% by weight, based on the total weight of the support.

Furthermore, zirconium compounds can be added to the slurry based on the finely particulate hydrogel, preferably silica hydrogel, preferably in the form of compounds selected from the group consisting of zirconium hydroxide, zirconium oxide-hydroxide, $ZrO_2$, $ZrO(NO_3)_2$, $Zr(OR)_4$ and $Zr(OOCR)_4$, where R is preferably selected from the group consisting of substituted or unsubstituted alkyl having from 1 to 20 carbon atoms, e.g. methyl, ethyl, n-propyl, n-butyl, tert-butyl, n-pentyl, n-hexyl, n-heptyl, n-octyl, vinyl, allyl, benzyl and phenyl. Preference is given to the zirconium content of the support being in the range from ≧0.1% by weight to ≦10% by weight, preferably in the range from ≧0.5% by weight to ≦5% by weight, more preferably in the range from ≧1% by weight to ≦4% by weight, particularly preferably in the range from ≧2% by weight to ≦3% by weight, based on the total weight of the support.

Furthermore titanium can be added to the slurry based on the finely particulate hydrogel, preferably silica hydrogel, preferably in the form of compounds selected from the group consisting of titanium hydroxide, titanium oxide-hydroxide, $TiO_2$, $TiO(NO_3)_2$, $Ti(OR)_4$ and $Ti(OOCR)_4$, where R is preferably selected from the group consisting of substituted or unsubstituted alkyl having from 1 to 20 carbon atoms, e.g. methyl, ethyl, n-propyl, n-butyl, tert-butyl, n-pentyl, n-hexyl, n-heptyl, n-octyl, vinyl, allyl, benzyl and phenyl. Preference is given to the titanium content of the support being in the range from ≧0.1% by weight to ≦10% by weight, preferably in the range from ≧0.5% by weight to ≦5% by weight, more preferably in the range from ≧1% by weight to ≦4% by weight, particularly preferably in the range from ≧2% by weight to ≦3% by weight, based on the total weight of the support.

Further suitable support materials are known and available commercially.

The support material can also be partially or fully modified before use in the process. The support material can, for example, be treated under oxidizing or nonoxidizing conditions at temperatures of from 200 to 1000° C., if appropriate in the presence of fluorinating agents such as ammonium hexafluorosilicate. In this way, it is possible, inter alia, to vary the water content and/or OH group content. The support material is preferably dried at from 100 to 200° C. under reduced pressure for from 1 to 10 hours before being used.

In the steps (b) and (c) of the process for preparing the catalyst of the invention, the compounds of the elements chromium and zirconium are applied, and it should be emphasized that the steps (b) and (c) can be carried out simultaneously or in succession in any order.

Preference is given to using chromium compounds having a valence of less than six, particularly preferably Cr(III) compounds. Compounds of this type include, for example, chromium hydroxide and soluble salts of trivalent chromium with an organic or inorganic acid, e.g. acetates, oxalates, sulfates or nitrates. Particular preference is given to salts of such acids which during activation are converted essentially into chromium(VI) without leaving a residue, e.g. chromium(III) nitrate nonahydrate. Furthermore, chelate compounds of chromium, e.g. chromium derivatives of β-diketones, β-ketoaldehydes or β-dialdehydes, and/or complexes of chromium, e.g. chromium(III) acetylacetonate or chromium hexacarbonyl, or organometallic compounds of chromium, e.g. bis(cyclopentadienyl)chromium(II), organic chromic (VI) esters or bis(arene)chromium(0), can likewise be used.

Preference is given to using zirconium compounds of the general formula $Zr(OR)_nX_{4-n}$, where R is preferably a hydrocarbon compound which has from 1 to 20 carbon atoms and is preferably selected from the group consisting of substituted or unsubstituted alkyl groups such as methyl, ethyl, n-propyl, n-butyl, tert-butyl, n-pentyl, n-hexyl, n-heptyl, n-octyl, vinyl, allyl, benzyl, phenyl; X is preferably a halogen atom, a carboalkoxy group, a carboxyl group, an acyl alkenate or a hydrocarbon compound having from 1 to 20 carbon atoms and n is an integer from 0 to 4. Preferred zirconium compounds are selected from the group consisting of $ZrCl_4$, $ZrO(NO_3)_2$, $ZrOSO_4$, $ZrOCl_2$, $Zr(OR)_4$, zirconium acetate, zirconium ethylhexanoate, zirconium pentane dionate, zirconium acetylacetonate and/or zirconium oxalates such as $M_4Zr(C_2O_4)_4$, $(NH_4)_4Zr(C_2O_4)_4$, where M is an alkali metal or ammonium. Particular preference is given to zirconium (IV) propoxide.

Suitable solvents include all organic polar solvents. Particular preference is given to organic protic solvents. The organic solvents are preferably saturated, unsaturated or aromatic organic liquids containing heteroatoms of groups 15, 16 and 17.

For the purposes of the present invention, a protic medium is a solvent or solvent mixture which comprises from 1 to 100% by weight, preferably from 50 to 100% by weight and particularly preferably 100% by weight, of a protic solvent or a mixture of protic solvents and from 99 to 0% by weight, preferably from 50 to 0% by weight and particularly preferably 0% by weight, of an aprotic solvent or a mixture of aprotic solvents, in each case based on the protic medium.

Protic organic solvents are, for example, alcohols $R^1$—OH, amine $NR^1_{2-x}H_{x+1}$, $C_1$-$C_5$-carboxylic acids, preferably alcohols $R^1$—OH, where the radicals $R^1$ are each, independently of one another, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part or $SiR^2_3$, the radicals $R^2$ are each, independently of one another, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part and x is 1 or 2. Possible radicals $R^1$ or $R^2$ are, for example, the following: $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropane, cyclobutane, cyclopentane, cyclohexane, cycloheptane, cyclooctane, cyclononane or cyclododecane, $C_2$-$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may bear further alkyl groups as substituents, e.g. phenyl, naphthyl, biphenyl, anthranyl, o-, m-, p-methylphenyl, 2,3-, 2,4-, 2,5-, or 2,6-dimethylphenyl, 2,3,4-2,3,5-, 2,3,6-, 2,4,5-, 2,4,6- or 3,4,5-trimethylphenyl, or aralkyl which may bear further alkyl groups as substituents, e.g. benzyl, o-, m-, p-methylbenzyl, 1- or 2-ethylphenyl, where the two $R^1$ or two $R^2$ may in each case also be joined to form a 5- or 6-membered ring and the organic radicals $R^1$ and $R^2$ may also be substituted by halogens such as fluorine, chlorine or bromine. Preferred carboxylic acids are $C_1$-$C_3$-carboxylic acid such as formic acid or acetic acid. Preferred alcohols R1-OH are methanol, ethanol, 1-propanol, 2-propanol, 1-butanol, 2-butanol, 1-pentanol, 2-pentanol, 1-hexanol, 2-ethylhexanol, 2,2-dimethylethanol or 2,2-dimethylpropanol, in particular methanol, ethanol, 1-propanol, 1-butanol, 1-pentanol, 1-hexanol or 2-ethylhexanol. The water content of the protic medium is preferably less than 20% by weight.

Aprotic organic solvents are, for example, ketones, ethers, esters and nitriles, without being restricted thereto.

The homogeneous solution comprising the chromium compound and the compound of the further elements is preferably added to the support, but the support can also be suspended in a solution comprising the appropriate chromium compound and the liquid constituents of the reaction mixture can be evaporated with continuous, preferably homogeneous, mixing.

The application of a chromium compound is preferably carried out from a 0.05% strength by weight to 15% strength by weight solution of a chromium compound which is converted under the activation conditions into chromium(VI) oxide in a $C_1$-$C_4$-alcohol, with the respective solvent preferably containing not more than 5% by weight of water. Loading of the support without use of solvents, for example by mechanical mixing, is also possible.

The chromium compound is present in a concentration of usually from 0.05 to 20% by weight, preferably from 0.1 to 15% by weight and particularly preferably from 0.5 to 10% by weight, based on the solvent. The zirconium compound is present in a concentration of usually from 0.05 to 30% by weight, preferably from 0.1 to 20% by weight and particularly preferably from 0.5 to 15% by weight, based on the solvent, with the molar ratios according to the invention being set.

The amount of solution used during doping in the steps (b), (c) or (b2) is preferably smaller than the pore volume of the support.

Reaction steps (b) and (c) can be carried out independently of one another at temperatures of from 0 to 150° C. For cost reasons, room temperature is preferred in both cases. To improve the solvent capability, a slightly elevated temperature up to 60° C. can also be preferred.

After application of the chromium compound and the zirconium compound, which will hereinafter be referred to as basic doping, the support is largely freed of solvent, preferably at temperatures of from 20 to 150° C. and pressures of from 10 mbar to 1 mbar, if this is necessary for the subsequent calcination (optional step d). This can, if appropriate, be carried out under reduced pressure and/or at elevated temperature. The precatalyst obtained in this way can be completely dry or can have a certain residual moisture content. The volatile constituents still present preferably make up not more than 20% by weight, in particular not more than 10% by weight, of the still unactivated chromium-containing precatalyst.

The precatalyst obtained from reaction step (b) or (c) can immediately be subjected to step (e) or else can be calcined beforehand in a further intermediate step in a water-free inert gas atmosphere at temperatures above 280° C. The calcination is preferably carried out at temperatures of from 280 to 800° C. in a fluidized bed for from 10 to 1000 minutes.

The concluding calcination (step e) of the doped support, hereinafter referred to as precatalyst, is carried out at temperatures of from 350 to 1050° C., preferably from 400 to 950° C. For the purposes of the present invention, calcination is the thermal activation of the catalyst in an oxidating atmosphere, with the chromium compound applied being converted into the hexavalent state, i.e. activated, if this is not already the case. The choice of calcination temperature is determined by the properties of the polymer to be prepared and the activity of the catalyst. The upper limit is imposed by the sintering of the support and the lower limit is imposed by the activity of the catalyst becoming too low. Calcination is preferably carried out at least 20-100° C. below the sintering temperature. The influence of the calcination conditions on the catalyst are known in principle and are described, for example, in Advances in Catalysis, Vol. 33, page 48 ff. The calcination preferably takes place in an oxygen-containing atmosphere. The intermediate obtained from step (c) or (c2) or (d) is preferably activated directly in the fluidized bed by replacement of the inert gas by an oxygen-containing gas and by increasing the temperature to the activation temperature. It is preferably heated at the appropriate calcination temperature in a water-free gas stream comprising more than 10% by volume of oxygen for from 10 to 1000 minutes, in particular from 150 to 750 minutes, and then cooled to room temperature, resulting in the Phillips catalyst to be used according to the invention.

The activation can be carried out in a fluidized bed and/or in a stationary bed. Preference is given to carrying out a thermal activation in fluidized-bed reactors.

The precatalysts can also be doped with fluoride. Doping with fluoride can be carried out during preparation of the support, application of the transition metal compounds (basic doping) or during activation. In a preferred embodiment of the preparation of the supported catalyst, a fluorinating agent is brought into solution together with the desired chromium and zirconium compounds in step (b) or (c) and this solution is applied to the support.

In a further preferred embodiment, doping with fluorine is carried out after the basic doping during the calcination step (e) of the process for preparing the catalyst of the invention. Fluoride doping is particularly preferably carried out together with the activation at temperatures in the range from 350° C. to 1050° C. in air. A suitable apparatus for this purpose is, for example, a fluidized-bed activator.

Fluorinating agents are preferably selected from the group consisting of $ClF_3$, $BrF_3$, $BrF_6$, $(NH_4)_2SiF_6$ (ammonium hexafluorosilicate, ASF for short), $NH_4BF_4$, $(NH_4)_2AlF_6$, $NH_4HF_2$, $(NH_4)_3PF_6$, $(NH_4)_2TiF_6$ and $(NH_4)_2ZrF_6$. Preference is given to using fluorinating agents selected from the group consisting of $(NH_4)_2SiF_6$, $NH_4BF_4$, $(NH_4)_2AlF_6$, $NH_4HF_2$, $(NH_4)_3PF_6$. Particular preference is given to using $(NH_4)_2SiF_6$.

The fluorinating agent is generally used in an amount in the range from 0.3% by weight to 10% by weight, preferably in the range from 0.5% by weight to 8% by weight, particularly preferably in the range from 0.5% by weight to 5% by weight, very particularly preferably in the range from 0.5% by weight to 3% by weight, based on the total mass of the catalyst used. Preference is given to using from 1% by weight to 2.5% by weight, based on the total mass of the catalyst used. The properties of the polymers prepared can be varied as a function of the amount of fluoride in the catalyst.

Fluorination of the catalyst system can advantageously lead to a narrower molar mass distribution of the polymers obtainable by a polymerization than is the case in a polymerization by means of a nonfluorinated catalyst.

After the calcination, the precatalyst can, if appropriate, be reduced, for example by means of reducing gases such as CO or hydrogen, preferably at from 350 to 950° C., to obtain the actual catalytically active species. However, the reduction can also be carried out only during the polymerization by means of reducing agents present in the reactor, e.g. ethylene, metal alkyls and the like.

Particular preference is given to applying the chromium compound and the zirconium compound simultaneously. For this purpose, a necessarily homogeneous solution of a chromium compound and a zirconium compound is prepared in step (b2) and is brought into contact with the support in step (c2). The chromium compound and the zirconium compound can be brought into contact with the solvent in any order, simultaneously or as a premixed mixture. The chromium compound and the zirconium compound are preferably mixed separately, in any order, with the solvent. The reaction time is usually in the range from 10 seconds to 24 hours, preferably from 1 minute to 10 hours and particularly preferably from 10 minutes to 5 hours, before contact with the support material occurs.

Simultaneous doping of chromium and zirconium from a homogeneous solution achieves a particularly homogeneous distribution of chromium and zirconium on the support. Without wishing to be tied to this hypothesis, the formation of mixed clusters of zirconium and chromium could be responsible for the advantageous properties of the catalyst, since a sudden change in color of the solution was observed.

A particularly advantageous process for preparing the catalyst of the invention therefore comprises the steps
(a) preparing an inorganic, finely divided and porous support,
(b2) preparing a homogeneous solution comprising an organic or inorganic chromium compound and zirconium compound in a protic or aprotic polar solvent,
(c2) bringing the solution from (b2) into contact with a finely divided inorganic support,
(d) if appropriate, removing the solvent from the solid and
(e) calcining the solid at temperatures of from 350 to 1050° C., preferably from 400 to 950° C., under oxidative conditions.

Further particular preference is given to a process consisting of the abovementioned steps.

In principle, all chromium compounds and zirconium compounds which are sufficiently soluble in the chosen solvent to form a homogeneous solution and are inert toward the solvent can be used in step b2).

It is also advantageous for no further calcination of the catalyst precursor apart from step (e) to be carried out during the process of preparation, in particular between the steps (b) and (c).

Catalysts of the invention can be used, in particular, for the polymerization and/or copolymerization of olefins. The present invention therefore provides a process for preparing an ethylene polymer by polymerization of ethylene and, if appropriate, $C_3$-$C_{20}$-olefins as comonomers in the presence of the polymerization catalyst prepared according to the invention.

The catalysts of the invention can be used in the known catalytic polymerization processes such as suspension polymerization processes, solution polymerization processes and/or gas-phase polymerization processes. Suitable reactors are, for example, continuously operated stirred reactors, loop reactors, fluidized-bed reactors or horizontally or vertically stirred powder bed reactors, tube reactors or autoclaves. Of course, the reaction can also be carried out in a plurality of reactors, connected in series. The reaction time depends critically on the reaction conditions selected in each case. It is usually in the range from 0.2 hour to 20 hours, mostly in the range from 0.5 hour to 10 hours. Advantageous pressure and temperature ranges for the polymerization reactions can vary within wide ranges and are preferably in the range from −20° C. to 300° C. and/or in the range from 1 bar to 4000 bar, depending on the polymerization method.

Preference is given to carrying out the polymerization in a reactor containing a fluidized bed or suspension of finely particulate polymer at a pressure of from 0.5 to 6 MPa and a temperature of from 30 to 150° C.

In solution polymerization processes, the temperature is preferably in the range from 110° C. to 250° C., more preferably in the range from 120° C. to 160° C. In solution polymerization processes, the pressure is preferably in the range up to 150 bar. In suspension polymerizations, the suspension is usually carried out in a suspension medium, preferably in an alkane. The polymerization temperatures in suspension polymerization processes are preferably in the range from 50° C. to 180° C., more preferably in the range from 65° C. to 120° C., and the pressure is preferably in the range from 5 bar to 100 bar. The order of addition of the components in the polymerization is generally not critical. It is possible either for monomer to be initially placed in the polymerization vessel and the catalyst to be added subsequently, or for the catalyst system to be initially charged together with solvent and monomer to be added subsequently.

Antistatics can optionally be added to the polymerization. Preferred antistatics are, for example, ZnO and/or MgO, with these antistatics preferably being able to be used in amounts ranging from 0.1% by weight to 5% by weight, based on the total amount of the catalyst mixture. The water content of ZnO or MgO is preferably less than 0.5% by weight, more preferably less than 0.3% by weight, based on the respective total mass. An example of a commercial product which can be used is Stadis 450, obtained from Dupont. Antistatics which can be used are, for example, known from EP 22 93 68, U.S. Pat. No. 5,026,795 and U.S. Pat. No. 4,182,810.

The polymerization can be carried out batchwise, for example in stirring autoclaves, or continuously, for example in tube reactors, preferably in loop reactors, in particular by the Phillips PF process as described in U.S. Pat. No. 3,242,150 and U.S. Pat. No. 3,248,179. Semicontinuous processes in which a mixture of all components is produced first and further monomers or monomer mixtures are metered in during the polymerization can also be used.

The polymerization and/or copolymerization is particularly preferably carried out as a gas-phase fluidized-bed process and/or suspension process. The gas-phase polymerization can also be carried out in the condensed, supercondensed or supercritical mode. If desired, different or identical polymerization processes can also be connected in series so as to form a polymerization cascade. Furthermore, an additive such as hydrogen can be used in the polymerization processes to regulate the polymer properties. If desired, hydrogen can be used as molecular weight regulator.

general, supported catalysts having particle sizes in the range from 1 µm to 400 µm, preferably in the range from 40 µm to 200 µm, can be used, while in fixed-bed reactors preference is given to using supported catalysts having particle sizes in the range from 0.5 mm to 10 mm.

The polymerization and/or copolymerization in a gas-phase fluidized-bed process is preferably carried out using supported catalysts having a mean particle size of the catalyst particles in the range from 30 µm to 300 µm, preferably in the range from 40 µm to 100 µm, particularly preferably in the range from 40 µm to 80 µm.

The polymerization and/or copolymerization in a suspension process is preferably carried out using supported catalysts having a mean particle size of the catalyst particles in the range from 30 µm to 350 µm, preferably in the range from 40 µm to 100 µm.

In a polymerization and/or copolymerization using the catalysts of the invention, the output of polymer having a particle size in the range from >0 µm to ≦125 µm is, in particular embodiments, advantageously in the range below 5% by volume, preferably in the range below 2% by volume, particularly preferably in the range below 1% by volume, based on the total output.

In a polymerization and/or copolymerization in a gas-phase fluidized-bed process using the catalysts of the invention, the output of polymer having a particle size in the range from >0 µm to ≦125 µm is advantageously in the range below 5% by volume, preferably in the range below 2% by volume, particularly preferably in the range below 1% by volume, based on the total volume of the output. In a polymerization and/or copolymerization in a suspension process using the catalysts of the invention, the output of polymer having a particle size in the range from >0 µm to ≦125 µm, can also preferably begin the range below 5% by volume, more preferably in the range below 2% by volume, particularly preferably in the range below 1% by volume, based on the total volume of the output.

Furthermore, in a polymerization and/or copolymerization using the catalysts of the invention, the output of polymer having a particle size in the range from >0 µm to ≦250 µm is, in preferred embodiments, advantageously in the range below 12% by volume, preferably in the range below 10% by volume, more preferably in the range below 8% by volume, particularly preferably in the range below 6% by volume and very particularly preferably in the range below 5% by volume, based on the total volume of the output.

In a polymerization and/or copolymerization, in particular of 1-alkene, in a gas-phase fluidized-bed process using the catalysts of the invention, the output of polymer having a particle size in the range >0 µm to ≦250 µm can advantageously be in the range below 12% by volume, preferably in the range below 10% by volume, more preferably in the range below 8% by volume, particularly preferably in the range below 6% by volume and very particularly preferably in the range below 5% by volume, based on the total volume of the output. In a polymerization and/or copolymerization in a suspension process using the catalysts of the invention, the output of polymer having a particle size in the range from >0 µm to ≦250 µm can also preferably be in the range below 12% by volume, more preferably in the range below 10% by volume, with further preference in the range below 8% by volume, particularly preferably in the range below 6% by volume and very particularly preferably in the range below 5% by volume, based on the total volume of the output.

The very low fine dust outputs which can be achieved in polymerization processes using the catalysts of the invention are a particular advantage of the present invention. A low output of fine polymer dust can lead to a polymerization product having improved properties, for example an improved film grade and/or a lower frequency of specks in the polymer films. A lower output of fine polymer dust can also lead to significantly better manageability of the polymerization process. A lower output of fine polymer dust can advantageously lead to prevention of or at least a significant reduction in the formation of lumps, deposits on walls and agglomerates in the reactor which, particularly in gas-phase processes, block the output lines and can lead to shutdown and cleaning of the plant.

The catalysts of the invention also make it possible to produce, in particularly preferred embodiments using the catalyst systems of the invention, polymers and/or copolymers, in particular ones which can be prepared from 1-alkene, having a high poured density and small proportions of fine and/or very fine material.

As a result of the use of the catalysts of the invention, it is possible and preferred to produce a polymer powder having a poured density of at least 460 kg/m³, preferably at least 470 kg/m³, in a suspension polymerization reactor or gas-phase fluidized-bed reactor.

A further great advantage of particularly preferred embodiments of the catalyst of the invention is a surprisingly high activity and productivity of the supported catalysts in the polymerization and copolymerization of olefins.

In preferred embodiments, the productivity of the catalysts in the polymerization and/or copolymerization of olefins is in the range from 500 g of polymer per g of catalyst to 9000 g of polymer per g of catalyst, in more preferred embodiments in the range from 1000 to 9000 g of polymer per g of catalyst, in especially preferred embodiments in the range from 4000 to 9000 g of polymer per g of catalyst and in particularly preferred embodiments in the range from 5000 to 9000 g of polymer per g of catalyst.

The catalysts of the invention make it possible to produce ethylene polymers having a mean molar mass of above 30000, preferably above 50000, particularly preferably above 80000, with a productivity of above 5000 g, preferably above 6000 g, of polymer per g of catalyst. The polydispersity $M_w/M_n$ of the polymers is from 13 to 30, preferably from 13 to 25, particularly preferably from 13 to 22.

Owing to their good mechanical properties, the polymers and copolymers of olefins which are prepared using supported catalysts which can be prepared according to the invention are particularly suitable for the production of films, fibers and moldings comprising polymers of olefins according to the present invention as significant or exclusive components.

EXAMPLES

The physical parameters of the catalysts or polymers were determined by the following methods:

| | |
|---|---|
| Density [g/cm³] | ISO 1183 |
| Intrinsic viscosity η: | ISO 1628 at 130° C. and a concentration of 0.001 g/ml in decalin. |
| FNCT | ISO 16770.3 at 80° C., 3.5 MPa, 2% of Antarox CO 630, bars 90 × 10 × 10 mm, notched depth 1.6 mm. |
| ESCR | (Enviromental Stress Cracking Resistance) Disk-shaped test specimens (produced from a press plate, diameter 38 mm, thickness 1 mm, scored on one side, with a notch 20 mm long and 200 µam deep) are fixed so as to be gastight onto a hollow stainless steel cylinder which is open at the top. The disks together with the hollow cylinder are then dipped at 80° C. into a 5% strength aqueous solution of Lutensol FSA, and a gas pressure of 3 bar is applied to the disk-shaped test specimens via the hollow cylinder. The time until occurrence of stress cracks which cause a pressure drop in the hollow cylinder is measured. Each measured value is the mean of 5 individual measurements. |
| Izod impact toughness: | ISO 180/A |
| Molar masses $M_w, M_n, M_w/M_n$, | high-temperature gel permeation chromatography using a method based on DIN 55672 using 1,2,4-trichlorobenzene as solvent, a flow of 1 ml/mm at 140° C. Calibration was carried out using PE standards on a Waters 150° C. |
| Surface area, pore volume: | nitrogen adsorbtion using the BET technique (S. Brunnauer et al., J of Am. Chem. Soc. 60, p.209-319, 1929). |
| Poured density: | DIN 53468, measured on the polymer powder. |
| $MFR_2, MFR_{21}$ | Melt flow rate in accordance with ISO 1133 at a temperature of 190° C. and under a load of 2.16 or 21.6 kg. |
| Proportion of fine dust: | Sieve analysis |
| Tensile impact strength | ISO 8256:1996, method A, test specimen 1, at a temperature of −30° C. The press plates were produced in accordance with DIN 16776/part 2 from powder or milled sheet scrap. Cooling rate: 15 K/min. |
| $MFR_{21}$ drop | Brabender test: 39 g of polymer powder whose $MFR_{21}$ had been determined beforehand were kneaded at 200° C. and a rotational speed of 50 rpm for 5 minutes. The $MFR_{21}$ of the kneaded material was then measured. The MFR drop is the relative decrease in the value from the polymer powder to the kneaded material. |
| Swelling behavior | The swelling behavior was determined by comparison of bottle weights. A Battenfeld-Fischer extruder was used at a melt temperature of 200° C. and a product throughput of 8 kg/h. As test bottle, use was made of a bottle having the shape AO18, weight 22 g with capacity of about 310 ml. As comparative product, use was made of a 22 g bottle produced from Lupolen 5261 Z (product of Basell). |

Example 1 a) Preparation of the Catalyst 1.5 kg of the support Sylopol (Grace) 2107 were placed in a double-cone dryer. A solution of 120 g of $Cr(NO_3)_3 \cdot 9H_2O$ in 2 l of methanol was then added. After mixing for one hour, the catalyst precursor was dried at 90° C. under reduced pressure for 5 hours.

A solution of 157 g of Zr(IV) propoxide (70% strength in n-propanol) in 1.4 l of n-propanol was subsequently added and the suspension was stirred at 8 rpm for 1 hour. After the mixing time, the catalyst precursor was dried at 120° C. under reduced pressure for 6 hours.

b) Activation

The activation of the catalyst precursor doped with chromium and zirconium was carried out at the calcination temperature indicated in Table 1. 2.5% by weight of ammonium hexafluorosilicate (ASF), based on the total mass of the catalyst, were added. For the activation, the catalyst precursor was heated to 350° C. over a period of 1 hour, held at this temperature for 1 hour, subsequently heated to the desired activation temperature, held at this temperature for 2 hours and subsequently cooled, with cooling below a temperature of 350° C. being carried out under nitrogen.

c) Polymerization

The polymerizations were carried out as suspension processes in isobutane in a 0.2 m³ PF loop reactor. The melt flow rate ($MFR_{21}$) and the density were set via the hexene concentration or ethene concentration. Polymerization was carried out at reactor temperatures of from 99° C. to 107° C. The reactor pressure was 3.9 MPa.

The polymerization conditions are summarized in Table 1.

Example 2 a) Preparation of the Catalyst

C100SPT: Cr then Zr 1.5 kg of the catalyst precursor having a chromium content of 1%, prepared as described in EP-A-589 350, was placed in a double-cone dryer. 1.4 l of n-propanol and 94 g of Zr(IV) propoxide (70% strength in n-propanol) were placed in a 10 l stirred glass vessel and stirred for 0.5 hour.

The stirred glass vessel was rinsed with 0.5 l of n-propanol, and the suspension was mixed at 8 rpm for 1 hour. After the mixing time, the catalyst precursor was dried for 8 hours under reduced pressure at an external temperature of 120° C.

b) Activation

The activation was carried out by a method analogous to Example 1. The conditions are shown in Table 1.

c) Polymerization

The polymerization was carried out using a method analogous to Example 1. The precise conditions are shown in Table 1.

Example 3 a) Preparation of the Catalyst 1.5 kg of the catalyst precursor having a chromium content of 1% and prepared as described in EP 589350 were placed in a double-cone dryer. 1.4 l of n-propanol and 157 g of Zr(IV) propoxide (70% strength in n-propanol) were placed in the 10 l stirred glass vessel and were stirred for 0.5 hour.

The stirred glass vessel was rinsed with 0.5 l of n-propanol, and the suspension was mixed at 8 rpm for 1 hour. After the mixing time, the catalyst precursor was dried for 8 hours under reduced pressure at an external temperature of 120° C.

b) Activation

The activation was carried out by a method analogous to Example 1. The conditions are shown in Table 1.

c) Polymerization

The polymerization was carried out as in Example 1. The precise conditions are shown in Table 1.

Example 4 a) Preparation of the Catalyst 3 kg of the support Sylopol 2107 were placed in a double-cone dryer. 240 g of $Cr(NO_3)_3 \cdot 9H_2O$ were dissolved in 2.5 l of n-propanol with stirring in a 10 l stirred glass vessel. 314 g of Zr(IV) propoxide (as 70% strength colorless solution in n-propanol) were then added, with the previously deep blue solution suddenly becoming deep green. The solution was slowly pumped into the double-cone dryer. The stirred glass vessel was rinsed with 0.5 l of n-propanol, and the suspension was stirred at 8 rpm for 1 hour. After the mixing time, the catalyst precursor was dried for 8 hours under reduced pressure at an external temperature of 120° C.

b) Activation

The activation was carried out by a method analogous to Example 1. The conditions are shown in Table 1.

c) Polymerization

The polymerization was carried out as in Example 1. The precise conditions are shown in Table 1.

Example C5

Comparative Example a) Preparation of the Catalyst 1.5 kg of the support Sylopol 2107 were placed in a double-cone dryer. A solution of 120 g of $Cr(NO_3)_3 \cdot 9H_2O$ in 2 l of methanol was then added. After mixing for one hour, the catalyst precursor was dried at 90° C. under reduced pressure for 5 hours.

b) Activation

The activation was carried out by a method analogous to Example 1. The conditions are shown in Table 1.

c) Polymerization

The polymerization was carried out as in Example 1. The precise conditions are shown in Table 1.

Example C6

Comparative Example a) Preparation of the Catalyst

The catalyst having a chromium content of 1% was prepared as described in EP-A-589 350.

b) Activation

The activation was carried out by a method analogous to Example 1. The conditions are shown in Table 1.

c) Polymerization

The polymerization was carried out as in Example 1. The precise conditions are shown in Table 1.

Example C7

Comparative Example a) Preparation of the Catalyst

Sylopol 967 BW (Grace) was used as catalyst.

b) Activation

The activation was carried out by a method analogous to Example 1. The conditions are shown in Table 1.

c) Polymerization

The polymerization was carried out as in Example 1. The precise conditions are shown in Table 1.

TABLE 1

| Example | Polymerization conditions | | | | | | |
|---|---|---|---|---|---|---|---|
|  | 1 | 2 | 3 | 4 | C5 | C6 | C7 |
| Temperature [° C.] | 105 | 100 | 102 | 107 | 103 | 99 | 107 |
| Ethene [% by volume] | 16 | 16 | 16.6 | 13 | 15.9 | 17.3 | 12 |
| Hexene [% by volume] | 0.44 | 0.6 | 0.77 | 0.72 | 0.4 | 0.47 | 0.45 |
| Output [kg/h] | 32 | 32 | 33 | 34 | 33 | 33 | 32 |
| Productivity [g/kg] | 6700 | 5000 | 7100 | 9000 | 3900 | 4200 | 2800 |
| $MFR_{21}$ [g/10 min] | 2.0 | 2.7 | 1.9 | 2.0 | 1.95 | 2.0 | 1.9 |
| Density [kg/m3] | 949 | 950 | 949 | 949 | 949 | 951 | 949 |
| Poured density [kg/m³] | 485 | 498 | 488 | 504 | 444 | 455 | 470 |
| $M_w/1000$ [g/mol] | 503 | — | 560 | 481 | 513 | 614 | 637 |
| $M_w/M_n$ | 15.5 | — | 26 | 22.6 | 18 | 26 | 28 |
| Intr. viscosity [dl/g] | 4.5 | 4.6 | 5.1 | 4.91 | 4.4 | 5.1 | 5.7 |
| Kneaded material $MFR_{21}$ [g/10 min] | 1.8 | 2.3 | 1.8 | 1.7 | 1.4 | 1.5 | 0.9 |
| $MFR_{21}$ drop [%] | −10 | −15 | −10 | −15 | −28 | 25 | −47 |
| ESCR FNCT[h]/disks | 51/118 | 40/95 | 60/139 | 55/113 | 25/58 | 31/60 | 22/50 |
| Tensile impact strength [kJ/m²] | 258 | 230 | 255 | 255 | 230 | 210 | 160 |
| Support | Sylopol 2107 | as described in EP-A-589 350 | as described in EP-A-589 350 | Sylopol 2107 | Sylopol 2107 | as described in EP-A-589 350 | Sylopol 967 BW |
| Cr content [% by wt.] | 1 | 1 | 1 | 1 | 1 | 1 | 1 |
| Zr content [% by wt.] | 2 | 1.2 | 2 | 2 | 0 | 0 | 0 |
| ASF content [% by wt.] | 2.5 | 2.5 | 2.5 | 2.5 | 2.5 | 2.5 | 2.5 |
| Activation temp. [° C.] | 550 | 550 | 550 | 530 | 550 | 550 | 560 |
| Proportion of fine dust [% by weight] | 0.6 | — | 0.7 | 0.3 | 1.5 | 1.2 | 2.19 |
| Bottle weight at Product throughput | | | | | | | |
| of 8 kg/h | 21.3 | — | 23.0 | 20.8 | 22 | 24.1 | 22.8 |
| of 16 kg/h | 22.3 | — | 24.2 | 22.4 | 23.3 | 25.9 | 23.9 |
| Melt fracture | medium | medium | medium | medium | severe | severe | severe |
| Inside | smooth | smooth | smooth | smooth | rough | rough | rough |
| Specks | few | few | few | few | medium | medium | many |
| Streaks | none | none | none | none | few | few | many |

Comparison of the examples with Comparitive example C6 shows, in particular, that significantly improved poured densities can be achieved in the reactor at the same high viscosity or molar mass $M_w$ by means of the higher polymerization temperatures. Furthermore, it can be seen that the proportion of fine dust is significantly lower in the examples according to the invention than in the comparative examples. The polymers prepared using the catalysts of the invention also display an excellent balance of ESCR, HLMI drop and tensile impact strength.

The invention claimed is:

1. A process for preparing an ethylene polymer comprising polymerizing ethylene or ethylene with $C_3$-$C_{20}$-olefins as comonomers in the presence of a polymerization catalyst, the catalyst being obtained by a process comprising:

supporting compounds selected from the group consisting of chromium compound(s) and zirconium compound(s), and optionally a fluorinating agent, with an organic polar solvent onto a finely divided inorganic support having a pore volume, thereby forming a treated support; and calcining the treated support at a temperature of from 350 to 1050° C. under oxidative conditions, the catalyst having a chromium content of from 0.1 to 5% by weight, a zirconium content of from 0.5 to 10% by weight, in each case based on the element in the finished catalyst, and a molar ratio of zirconium to chromium from 0.6 to 5.

2. The process according to claim 1 wherein the chromium content of the catalyst is from 0.2 to 3% by weight.

3. The process according to claim 1 wherein the zirconium content of the catalyst is from 0.5 to 5% by weight.

4. The process according to claim 1 wherein the molar ratio of zirconium to chromium in the catalyst is from 0.7 to 3.

5. The process according to claim 1 wherein the catalyst further comprises a fluorine content of from 0.5 to 3% by weight, based on the element in the finished catalyst.

6. The process according to claim 1 wherein the catalyst support is obtained by a process comprising at least one spray drying step.

7. The process according to claim 1 wherein the support is obtained by a process comprising:

i) preparing a hydrogel;

ii) milling the hydrogel to give a finely particulate hydrogel in which at least 5% by volume of the particles, based on the total volume of the particles, have a particle size in the range from >0 μm to ≦3 μm, and/or at least 40% by volume of the particles, based on the total volume of the particles, have a particle size in the range from >0 μm to ≦12 μm, and/or at least 75% by volume of the particles, based on the total volume of the particles, have a particle size in the range from >0 μm to ≦35 μm;

iii) producing a slurry comprising the finely particulate hydrogel; and iv) dying the slurry.

8. The process according to claim 1 wherein the catalyst is prepared by a process comprising:

(a) preparing an inorganic, finely divided support;

(b) applying the chromium compound to the finely divided support;

(c) applying the zirconium compound to the support;

(d) optionally, removing the solvent from the solid; and (e) calcining the solid at a temperature of from 350 to 1050° C., under oxidative conditions, wherein steps (b) and (c) can be carried out together or separately, in any order.

9. The process according to claim 8 wherein the catalyst is prepared by a process comprising:

(a) preparing the inorganic, finely divided support;

(b2) preparing a homogeneous solution comprising an organic or inorganic chromium compound and a zirconium compound in a protic or aprotic polar solvent;

(c2) contacting the solution from (b2) with the finely divided inorganic support;

(d) optionally, removing the solvent from the solid; and (e) calcining the solid at a temperature of from 350 to 1050° C., under oxidative conditions.

10. The process according to claim 8 wherein no further calcination apart from step (e) is carried out.

11. The process according to claim 8 further comprising an amount of solution in steps (b) or (c) smaller than the pore volume of the support.

12. The process according to claim 8 wherein the solvent is an alcohol, ether, ketone or ester.

13. The process according to claim 8 wherein the chromium compounds are salts of trivalent chromium with an organic or inorganic acid.

14. The process according to claim 8 wherein the zirconium compounds are selected from the group consisting of $ZrCl_4$, $ZrO(NO_3)_2$, and $Zr(OR)_4$, where R is a $C_1$-$C_{20}$-hydrocarbon radical.

15. The process according to claim 1 wherein the polymerization is carried out at a pressure of from 0.5 to 6 MPa and a temperature of from 30 to 150° C. in a reactor containing a fluidized bed or suspension of finely particulate polymer.

16. The process according to claim 1 wherein the polymer is a powder having a poured density of at least 460 kg/m³.

17. The process according to claim 2 wherein the chromium content of the catalyst is from 0.3 to 1.5%.

18. The process according to claim 3 wherein the zirconium content of the catalyst is from 2 to 4%.

19. The process according to claim 4 wherein the molar ratio of zirconium to chromium in the catalyst is from 0.75 to 2.5.

20. The process according to claim 8 wherein the temperature of step (e) is from 400 to 950° C.

21. The process according to claim 9 wherein the temperature of step (e) is from 400 to 950° C.

22. The process according to claim 8 further comprising an amount of solution used in step (c2) smaller than the pore volume of the support.

23. The process of claim 12 wherein the solvent is an alcohol.

24. The process according to claim 13 wherein the salts of trivalent chromium are acetates, oxalates, sulfates or nitrates.

25. The process according to claim 14 wherein the zirconium compounds are zirconium(IV) propoxide, $Zr(OOCR)_4$, zirconium acetate, $M_4Zr(C_2O_4)$ where M is an alkali metal, $(NH_4)_4Zr(C_2O_4)_4$, zirconium acetylacetonate or mixtures thereof.

26. The process of claim 16 wherein the poured density is at least 470 kg/m³.

* * * * *